(12) United States Patent
Ala-Luukko

(10) Patent No.: US 7,640,029 B2
(45) Date of Patent: *Dec. 29, 2009

(54) METHOD AND SYSTEM FOR ROUTING OF SHORT MESSAGES IN A TELECOMMUNICATION SYSTEM

(76) Inventor: Sami Ala-Luukko, Gyidenintie 7 A 9, FIN-00200 Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/195,518

(22) Filed: Aug. 1, 2005

(65) Prior Publication Data

US 2005/0282567 A1   Dec. 22, 2005

Related U.S. Application Data

(63) Continuation of application No. 10/207,616, filed on Jul. 29, 2002, now Pat. No. 6,944,467.

(51) Int. Cl.
*H04Q 7/20* (2006.01)

(52) U.S. Cl. .................. 455/466; 455/432.1; 455/432.2

(58) Field of Classification Search ................. 455/466, 455/432.1, 432.2, 458, 414.1, 414.2, 414.3, 455/414.4, 445, 560, 552.1
See application file for complete search history.

(56) References Cited

U.S. PATENT DOCUMENTS

| | | | |
|---|---|---|---|
| 5,742,905 A | 4/1998 | Pepe et al. | |
| 5,862,481 A | 1/1999 | Kulkarni et al. | |
| 5,946,629 A | 8/1999 | Sawyer et al. | |
| 6,298,232 B1 * | 10/2001 | Marin et al. | ................. 455/413 |
| 6,944,467 B2 * | 9/2005 | Ala-Luukko | ................. 455/466 |
| 2004/0002324 A1 * | 1/2004 | Juntunen et al. | ............. 455/406 |
| 2005/0119015 A1 * | 6/2005 | Linkola | ...................... 455/466 |
| 2005/0197110 A1 * | 9/2005 | Hasan et al. | ................. 455/417 |

FOREIGN PATENT DOCUMENTS

EP   0748064 A2   12/1996

(Continued)

OTHER PUBLICATIONS

International Search Report dated Feb. 12, 1999.

(Continued)

*Primary Examiner*—Joseph H Feild
*Assistant Examiner*—Huy D Nguyen
(74) *Attorney, Agent, or Firm*—Foley & Lardner LLP

(57) ABSTRACT

A system for transmitting short messages between mobile communication systems includes a first mobile communication system which is based on a first mobile communication standard, a first short message service center connected to the first mobile communication system, a second mobile communication system based on a second mobile communication standard, a second short message service center connected to the second mobile communication system, a home location register connected to the second mobile communication system, a mobile services switching center connected to the second mobile communication system, and a gateway for communications with and between the first and second mobile communication system. In a method implementing this functionality a routing component sends to the gateway a routing data query addressed to a predetermined numerical space. The short message is transmitted to the gateway, based on the address received in response to the routing data query, for further transmission of the short message to the second mobile communication system.

17 Claims, 3 Drawing Sheets

FOREIGN PATENT DOCUMENTS

| | | | |
|---|---|---|---|
| EP | 0777394 | A1 | 6/1997 |
| FI | 20000164 | | 7/2001 |
| WO | WO 9701940 | A1 | 1/1997 |
| WO | WO 9720442 | A1 | 6/1997 |
| WO | WO 9736434 | A1 | 10/1997 |
| WO | WO 9828920 | A2 | 7/1998 |
| WO | WO 9830051 | A2 | 7/1998 |
| WO | WO 9832300 | A2 | 7/1998 |
| WO | WO 9846034 | A | 10/1998 |
| WO | WO 9856195 | A2 | 12/1998 |
| WO | WO 9914910 | A1 | 3/1999 |
| WO | WO 9933226 | A1 | 7/1999 |
| WO | WO 9957926 | A1 | 11/1999 |
| WO | WO 0010294 | A2 | 2/2000 |
| WO | WO 00/42790 | | 7/2000 |
| WO | WO 00/47004 | | 8/2000 |
| WO | WO 00/56091 | | 9/2000 |
| WO | PCT FI01/00074 | | 1/2001 |

OTHER PUBLICATIONS

International Search Report dated Nov. 7, 2000.
International Search Report dated Apr. 5, 2000.
International Search Report dated Apr. 9, 2000.

* cited by examiner

METHOD AND SYSTEM FOR ROUTING OF SHORT MESSAGES IN A TELECOMMUNICATION SYSTEM

CROSS-REFERENCE TO RELATED APPLICATION(S)

This application is a Continuation of prior application Ser. No. 10/207,616 filed Jul. 29, 2002 now U.S. Pat. No. 6,944,467.

BACKGROUND OF THE INVENTION

1. Field of the Invention

The present invention relates to telecommunication systems and, in particular, to a method and system for transmitting short messages between mobile communication systems which are based on different mobile communication standards.

2. Description of Related Art

There are currently in the world a number of digital mobile communication systems based on different mobile communication standards and protocols. Mobile communication networks, such as GSM (Global System for Mobile communications) networks, have become very popular in a large part of the world. In the United States, however, which is of course considered an important country when considering mobile communication systems, several other and incompatible mobile communication standards are now in use. More particularly, there are at present at least two digital mobile systems in use in the United States: DAMPS (Digital Advanced Mobile Phone System), which is based on the S-54 standard and which is compatible with the analog AMPS (Advanced Mobile Phone System) implementation, as well as CDMA (Code Division Multiple Access) which is based on the IS-95 standard. American mobile communication systems are ultimately based on the ANSI-41 trunk network standard. In addition, Japan has a mobile communication system that is based on its own, different standard JDC (Japan Digital Cellular).

Since the introduction of digital mobile networks, the services provided by and through such networks have included the short message service (SMS), which has rapidly become very popular throughout the world. The short message service is in actuality a radio paging system in which alphanumeric messages may be transmitted to the mobile subscriber, who can then read these messages on the subscriber's mobile station display whenever the subscriber wishes to do so. The transmission of short messages in the various different systems and protocols in use throughout the world is very similar, but these various implementations are nevertheless not wholly compatible. This has caused a particularly disadvantageous situation that results in significant difficulties and impediments when one wishes to send a short message between mobile communication systems that are based on different standards.

One especially significant problem that has arisen is the lack, under those circumstances, of a roaming feature for short messages as a connective factor between different mobile communication systems.

The term roaming is generally used to denote the co-operation of system operators through which the user of a mobile station is able to establish a connection in a wider area than just that user's own operator can offer. To enable roaming between different systems the system operators involved must agree with each other on the administration of inter-system roaming and adapt their systems to the technical and operating requirements necessary to effect the desired communication and co-operation between their respective systems.

Such roaming functionality has been available for phone calls, as between the GSM system operators of Europe, but other problems have arisen as a result of poor compatibility between different mobile communication systems. Cooperation between system operators of different mobile communication systems based on different standards has not heretofore enabled the use of roaming between such different systems for short messaging services.

OBJECT AND SUMMARY OF THE INVENTION

It is accordingly the desideratum of the present invention to eliminate, or at least significantly reduce, the problems, drawbacks and deficiencies, as for example those discussed hereinabove, of existing and prior art methods and arrangements and thereby enable the offering of inter-system text messaging and other mobile communication services to a notably widened user base.

It is a particular object of the invention to provide a novel method and system for enabling system operators to provide for their users a range of mobile communication services, such as short message services, between different mobile communication systems.

The present invention enables the availability of roaming functionality between different mobile communication systems that are based on different mobile communication standards through the use of a separate or distinct component, and more particularly as herein disclosed by way of preferred example a gateway. The gateway implements and provides features and functionality that the standard components of a mobile communication network do not generally include. The invention thereby enables a subscriber or user of a mobile communication system based on one mobile communication standard to send a short message to a subscriber or user of another mobile communication system based on a different mobile communication standard.

A telecommunication system in accordance with the invention comprises a first mobile communication system that is based on a first mobile communication standard, a first short message service centre, a second mobile communication system based on a second mobile communication standard, a second short message service centre, a home location register, a mobile services switching centre, and a gateway through which the first and second mobile communication systems can communicate;

As used herein, the term gateway is intended to denote, in the context of the preferred embodiments of the invention herein described, an SMS roaming gateway or other corresponding network element that functions as the transmitter or communications enabler between two mobile communication systems based on different communication standards.

In accordance with the inventive method, a short message is created on a terminal device of the first mobile communication system and is directed from that terminal device to the first mobile communication system. From the first short message service centre of the first mobile communication system, a routing data query for obtaining address information necessary for routing of the short message to its intended recipient is sent or presented to the gateway. The gateway responds to that query with the address of the routing gateway, based on which the short message may then be sent from the first short message service centre to the routing gateway for further transmission to the second mobile communication system.

The purpose of the routing data query is to locate the intended recipient subscriber in the coverage area of another (i.e. a second) mobile communication system. In some cases the gateway may already know the location of the intended recipient subscriber, in which case the first short message service centre will directly receive the necessary routing data in the gateway's response that includes the address of the gateway. This circumstance will arise where the system operator has configured the network so that one or more numbers of the short message service centre of the second mobile communication system for a particular numerical address space have been stored by the first short message service centre. Because of the resulting redundancy it is usually more preferable to use several numbers. This practice based on a predetermined numerical address space of another system's short message service centre may be employed to implement, by way of example, the ability to always provide for transmission of short messages intended for a subscriber of a particular operator directly to the short message service centre of that particular operator. The store-and-forward functionality that is characteristic of a short message—i.e. the process for handling of short messages when the mobile station of the intended recipient is not currently connected to the network or is otherwise unavailable for immediate receipt of the short message—is in such cases implemented in the short message service centre of the second mobile communication system. In other cases the short message of the sender is temporarily saved to the short message service centre of the first system, from which it is thereafter sent to the intended recipient after a further period of time has elapsed.

The gateway may also determine the location of the intended recipient subscriber from the home location register of the other or second mobile communication system, following which the gateway stores the determined address to its database and then returns its own address in response to the routing data query received from the first short message service centre.

In an embodiment of the invention the routing query from the first short message service centre, i.e. the HLR query, is transformed in the gateway into an HLR query that conforms to the second mobile communication standard, and the transformed query is then directed to the home location register of the second mobile communication system. As should be apparent, the query need not necessarily be an HLR query; a different from of query may be employed as a function of the configuration or requirements or practice of the particular network. In any event, the purpose of the query is to locate the intended recipient mobile station in the coverage area of another mobile communication system. The transformed query is received by the home location register of the second mobile communication system, and the address of the second mobile services switching centre that currently serves the mobile station of the second mobile communication system is then returned in a response to the gateway.

The address in that response is next transformed in the gateway to conform to the address format or the like used by the first mobile communication system, and is then sent to the short message service centre of the first mobile communication system.

At this point, the short message is sent from the first short message service centre to the gateway where it is transformed to conform to the second mobile communication standard, and the so-transformed short message is then transmitted from the gateway to the short message service centre of the second mobile communication system; alternatively, the transformed short message is transmitted from the gateway to the mobile services switching centre of the second mobile communication system. An acknowledgement of transmission of the transformed short message is then sent from the short message service centre of the second mobile communication system (or from the mobile services switching centre of the second system) to the gateway. The acknowledgement must be similarly transformed in the gateway to conform to the communication standard of the first mobile communication system, after which the transformed acknowledgement is directed from the gateway to the first short message service centre.

In effecting the transformation, the short message is modified from the Mobile-Terminating format to a Mobile-Originated format. There are two types of short messages. The first is a short message terminating in (i.e. intended for) a particular mobile station or originating from a specific mobile station, i.e. a certain specific terminal device; the second is a message terminating in all mobile stations in a particular area, such as an item of telecommunication information or notification or the like to be sent to a multiplicity of terminal devices. This kind of service may be received by all mobile stations capable of its receipt, and it is for that reason that the transformation of the short message from the Mobile-Terminating to a Mobile-Originated format is effected.

The present invention additionally provides a system for transmitting short messages between mobile communication systems in a telecommunication system comprising a first mobile communication system based on a first mobile communication standard, a first short message service centre of or connected to the first mobile communication system; a second mobile communication system based on a second mobile communication standard, a second short message service centre of or connected to the second mobile communication system, a home location register of or connected to the second mobile communication system, a mobile services switching centre of or connected to the second mobile communication system, and a gateway for receiving, transmitting and routing communications to and between the first and second mobile communication systems.

The telecommunication system further includes a routing component operable for processing a routing data query from the first short message service centre. The short message is transmitted, based on a response to the routing data query, to the second mobile communication system. A pointer is used to address to the gateway the routing data queries addressed to a predetermined numerical space, and a returner is used to return the address of the gateway to the first short message service centre.

The inventive system also includes a transformer operable for transforming, in the gateway, the HLR query from the first short message service centre into an HLR query that conforms to the second mobile communication standard, and for additionally transforming in the gateway—from the standard of the second to the standard of the first mobile communication system—the address that is returned in response to that query and that identifies the second mobile communication system mobile services switching centre that is handling the mobile station which is the intended recipient of the short message. In this latter transformation, the address of the gateway is attached or appended to the transformed response. A transformer disposed in the gateway is used to additionally transform the short message to be transmitted to the second mobile communication system so that it conforms to the second mobile communication standard, and to transform the acknowledgement received to confirm the transmission of the short message so that it conforms to the standard of the first mobile communication system. The acknowledgement may, by way of example, comprise a brief informative message to the originating sender of the short message.

Provided in the short message transmission system in the gateway is a temporary database that stores information about the mobile services switching centre of one or more subscribers of another mobile communication system, such as the address of the mobile services switching centre in whose coverage area the intended recipient subscriber is currently—i.e. at the time of the routing data query—located. One way to implement this database is by maintaining a temporary subscriber-specific database that holds information about the current mobile services switching centre of the subscriber for a sufficient period to time to effect delivery of the short message.

Another implementation of the invention returns information in the address field that unambiguously identifies the transaction, such as the address to which the short message service centre sends the short message. In this manner, from the point of view of the gateway two independent transactions between the home location register of the first mobile communication system and the gateway may be unambiguously correlated.

As compared with prior art methods and systems, the present invention advantageously renders it possible to transmit short messages between mobile stations of mobile communication systems based on different standards. Although the transmission of short messages in systems using different standards is actually effected in a similar manner, these different implementations are nevertheless incompatible. The present invention overcomes this incompatibility and thereby implements roaming functionality for short messages between mobile communication systems which are based on different communication standards.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
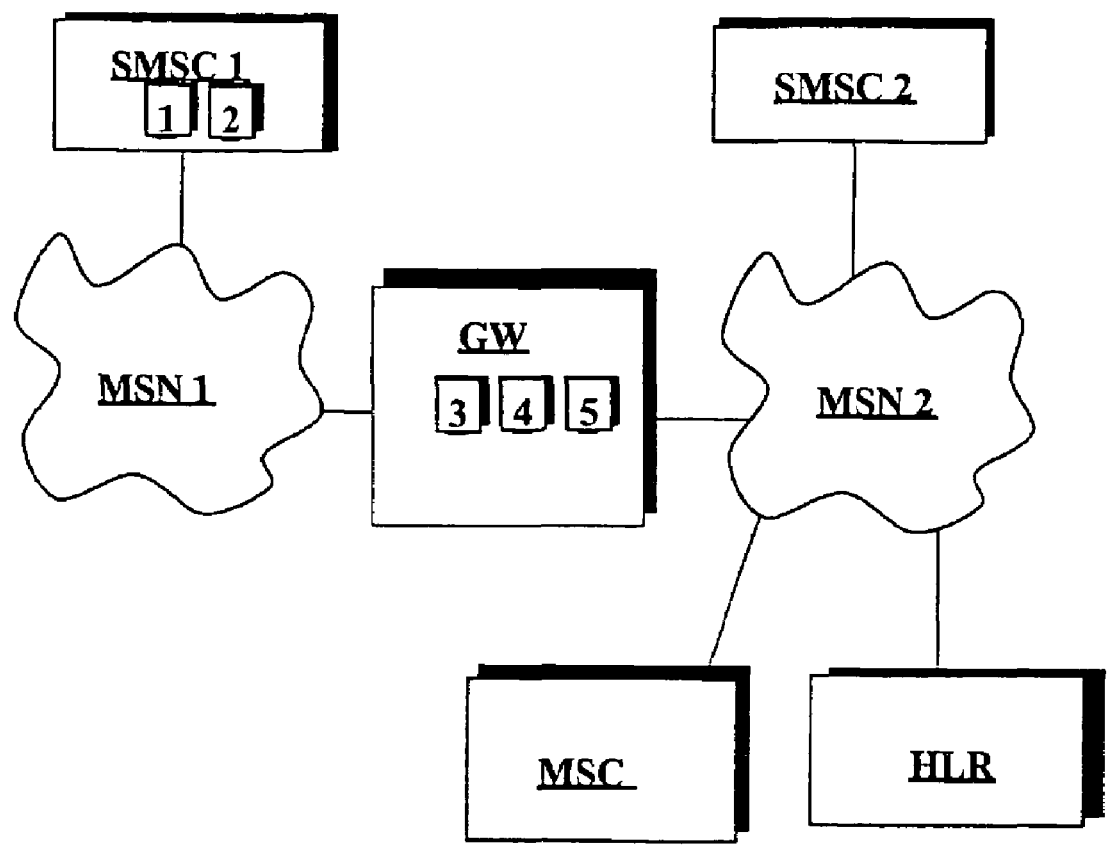
FIG. 1 is a schematic block diagram of a telecommunication system in accordance with the invention.

A telecommunication system constructed and configured in accordance with the present invention is shown in FIG. 1. That telecommunication system is comprised of a multiplicity of elements and components and includes a first mobile communication system MSN1, a first short message service centre SMSC1, a gateway GW, a second mobile communication system MSN2, a home location register HLR, a second short message service centre SMSC2, and a mobile services switching centre MSC.

The first mobile communication system may be, way of illustrative example, a system consistent with the GSM standard and that is operable to carry out the normal operations and functionality of a mobile communication network.

A router 1 of the first short message service centre SMSC1 is operable to initiate a routing data query directed to the gateway GW, based on a predetermined numerical space in which there are one or more numbers of the second short message service centre SMSC2 that correspond to a specific numerical space of the second mobile communication system mobile communication standard. The first short message service centre SMSC1 is also operable to receive, from the gateway GW, a response to the query which includes the address of the gateway and based on which response the short message is then transmitted to the identified gateway for subsequent further transmission to the second mobile communication system MSN2. The first short message service centre SMSC1 additionally receives an acknowledgement of transmission of the short message for subsequent retransmission therefrom.

In the present invention, the gateway GW is responsible for implementing and arranging the short message roaming functionality—i.e. the gateway functions as a connective component between systems or devices or components that use different mobile communication standards. The gateway GW includes a query returner 3 for returning its own address in response to an HLR query sent from the first short message service centre SMSC1. Since the HLR query is initiated on the basis of the subscriber number—thus in a GSM system the query is based on the MSISDN—a system operator will in accordance with the invention have configured the network so that HLR queries and the like directed to a predetermined subscriber numerical space of a system using another standard, as for example an ANSI41 operator, are routed to the. gateway GW.

The gateway GW further includes a transformer 4 operable for transforming the HLR query from the first short message service centre SMSC1 into a query that conforms to the communication standard of the second mobile communication system MSN2. The transformer is also used to transform the address of the mobile services switching centre MSC of the second mobile communication system MNS2, which address is received by the gateway in response to the query, to conform to the communication standard of the first mobile communication system MSN1, and the short message that is to be sent from the first communication system MSN1 is transformed to conform to the mobile communication standard of the second communication system MSN2. For example, in such a transformation the settings for the GSM format will be set to conform to the settings for the ANSI41 format. The transformer 4 of the gateway GW also transforms the short message transmission acknowledgement received from the second short message service centre SMSC2 or the mobile services switching centre to conform to the communication standard of the first mobile communication system MSN1.

The gateway, GW further includes a database 5 that stores information concerning the mobile services switching centre MSC of the second mobile communication system MSN2. The database 5, of the gateway is used to store the address of the mobile services switching centre in whose coverage area the subscriber is currently—i.e. at the time of the query—located.

The second mobile communication system MSN2 may, by way of illustrative example, be a mobile communication system consistent with the ANSI41 standard and that is operative to implement and carry out the normal functionality of a mobile communication network under that standard.

The HLR queries emanating or otherwise transmitted from the gateway are received by the home location register HLR. In responding to such queries, the address of the mobile services switching centre MSC of the intended recipient subscriber of the second mobile communication system MSN2 is attached as an item of routing data.

An acknowledgement of the transmission of the short message to the gateway GW is transmitted either from the mobile services switching centre MSC of the second mobile communication system MSN2, or from the second short message service centre SMSC2.

Figure 2:
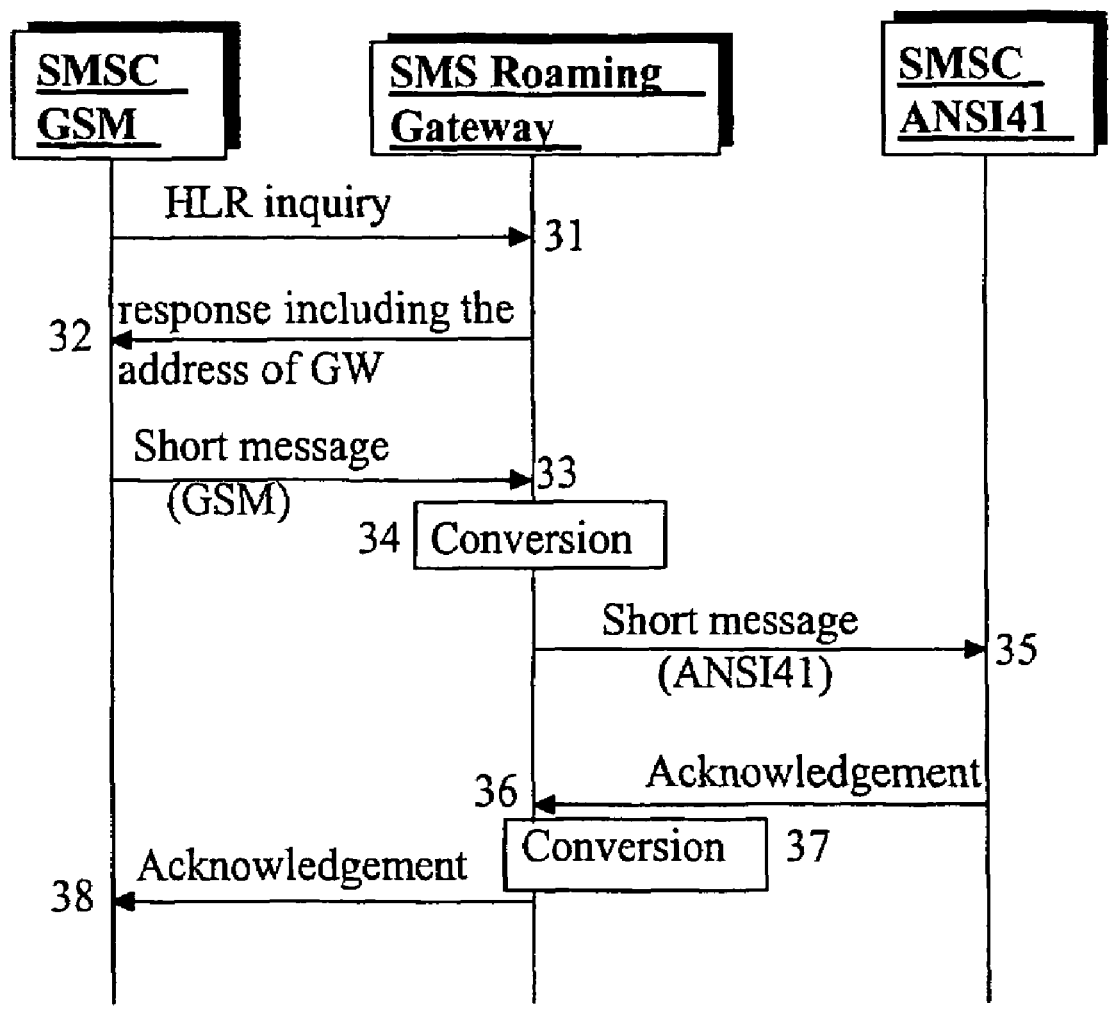
FIG. 2 is a signalling diagram for a first embodiment of a method in accordance with the invention.

FIG. 2 depicts a signalling diagram in accordance with one advantageous embodiment of the invention. The first short message service centre SMSC1 initiates a routing data query based on the subscriber number (step 31). The gateway GW receives the query and attaches to its response the address of the gateway (step 32); in prior art systems, on the other hand, the home location register HLR returns the address of the mobile services switching centre MSC in whose coverage area the subscriber is currently located. The short message service centre SMSC1 of the first mobile communication system MSN1 sends the short message to the gateway GW (step 33). The gateway receives the short message and transforms it to conform to the MSN2 standard of the second mobile communication system, as for example the ANSI41 standard (step 34). In this transformation the short message is at the same time transformed from the Mobile-Terminated format into a Mobile-Originated format so that the second short message service centre SMSC2 receiving the message can properly handle it.

The transformed short message is directed to the short message service centre SMSC2 of the second mobile communication system MSN2 (step 35), from which it is thereafter to be further transmitted. It is most reasonable and efficient to configure the address of the short message service centre SMSC2 of the second mobile communication system MSN2 in a subscriber-specific way, i.e. so that there are one or more numbers of the short message service centre SMSC2 of the second mobile communication system MSN2 for a specific numerical space. This arrangement may advantageously be employed to implement functionality by which the short messages of a subscriber of a particular system operator are always transmitted to the short message service centre of the relevant other system operator. The short message store-and-forward functionality in such an arrangement is implemented in the short message service centre SMSC2 of a second mobile communication system, such for example an ANSI41 operator. It should also be recognized that, in such an implementation, the operator of the second (e.g. ANSI41) mobile communication system MSN2 must allow the clients of the first or other (e.g. GSM) system operator to use the short message service centre of the second system MSN2; in prior art systems, on the other hand, only a system operator's own clients can use the short message service centre of that operator.

An acknowledgement of transmission of the short message is then sent from the short message service centre SMSC2 of the second mobile communication system MSN2 (step 36). This acknowledgement is transformed in the gateway GW to conform to the standard of the first mobile communication system MSN1 (step 37), and is then sent to and received by the first short message service centre SMSC1 (step 38) for subsequent transmission therefrom.

Figure 3:
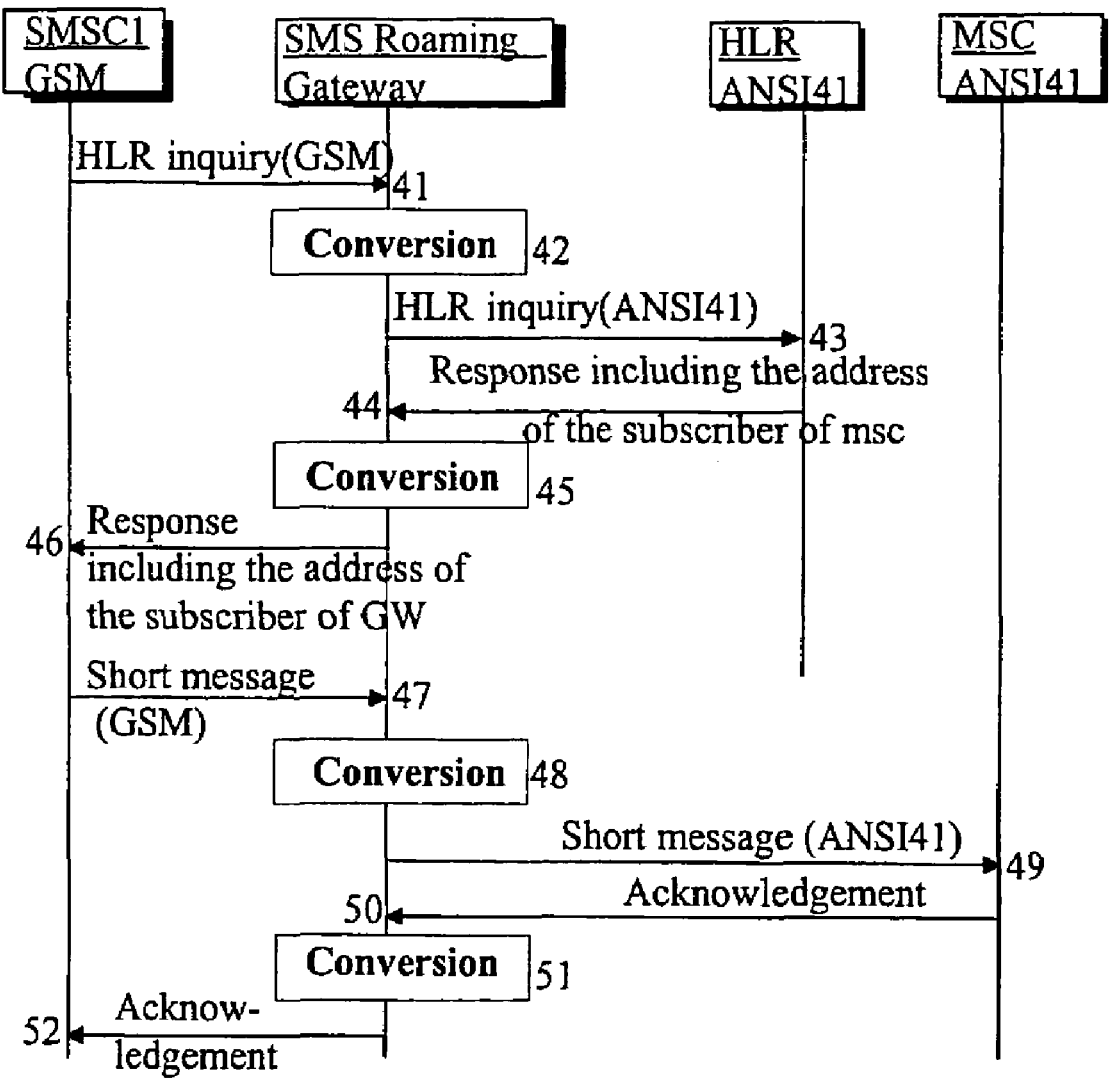
FIG. 3 is a signalling diagram for a second embodiment of a method in accordance with the invention.

FIG. 3 depicts a signalling diagram in accordance with another advantageous embodiment or implementation of the invention. As in the FIG. 2 embodiment, an HLR query is sent from the short message service centre SMSC1 of the first mobile communication system MSN1 to the gateway GW (step 41). That query is then transformed by the transformer of the gateway to conform to the second mobile communication standard (step 42), and is directed from the gateway GW to the home location register HLR of the second mobile communication system MSN2 (step 43). The address of the mobile services switching centre MSC of the subscriber is attached to the received response which is then returned to the gateway GW (step 44). In the gateway the attached address is transformed to conform to the standard of the first mobile communication system MSN1 (step 45), and is then sent to the first short message service centre SMSC1 with the address of the gateway (step 46).

With the location of the subscriber now known, the short message may be transmitted from the fist short message service centre SMSC1 to the gateway GW (step 47). In the gateway, the short message is transformed to conform to the second communication system standard (e.g. ANSI41) (step 48). The gateway GW then utilizes its own database and returns from that database the address of the mobile services switching centre MSC in whose coverage area the intended recipient subscriber was located at the time of the HLR query.

There are several methods by means of which a saved or stored piece of data may be correlated to a received short message. One such method is to maintain a temporary subscriber-specific database that retains information about the mobile services switching centre MSC of the intended recipient subscriber for a sufficient period of time to permit delivery of the message. Another is to return, as for example in the address field of a response message to an HLR query, information which unambiguously identifies the transaction. It should in this regard be understood that the term address is intended to connote the address to which the first short message service centre SMSC1 sends the short message. Thus, from the point of view of the gateway GW it is possible to unambiguously correlate two independent transactions, as for example between the home location register HLR of a GSM-standard communication system and the gateway.

When the gateway GW has completed its transformation of the short message to conform to the communication standard of the second mobile communication system MSN2, the transformed short message is sent to the mobile services switching centre MSC of the second mobile communication system (step 49). An acknowledgement of transmission of the short message is then sent from the mobile services switching centre MSC to the gateway (step 50), where it is transformed to conform to the communication standard of the first mobile communication system MSN1 and then directed to the first short message service centre SMSC1 (step 51) for further transmission therefrom.

Thus, while there have shown and described and pointed out fundamental novel features of the invention as applied to preferred embodiments thereof, it will be understood that various omissions and substitutions and changes in the form and details of the methods described and systems and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gateway for communicating short messages between a first mobile communication system and a second mobile communication system, comprising:
   a query returner configured to return an address of the gateway in response to a routing data query received from a first short message service center of the first mobile communication system, the routing data query associated with a short message to be routed to a subscriber of the second mobile communications system; and
   a transformer configured to transform the short message from a first communication standard of the first mobile communication system to a second communication standard of the second mobile communication system for subsequent transmission of the short message to the subscriber of the second mobile communication system.

2. The gateway of claim 1, wherein the transformer is further configured to transform a short message acknowledgement received from a short message service center of the second mobile communication system in response to the transmitted short message from the second communication standard to the first communication standard, and wherein the gateway is configured to send the short message acknowledgement to the first short message service center of the first mobile communication system.

3. The gateway of claim 1, wherein the transformer is further configured to transform the routing data query from the first communication standard of the first mobile communication system to the second communication standard of the second mobile communication system for transmission of the routing data query to a home location register of the second mobile communication system, and further configured to transform an address of a mobile services switching center associated with the subscriber of the second mobile communication system received from the home location register in response to the routing data query, and wherein the address of the mobile services switching center is appended to the address of the gateway in the response to a routing data query.

4. The gateway of claim 3, wherein the transformer is further configured to transform a short message acknowledgement received from a mobile services switching center of the second mobile communication system in response to the transmitted short message from the second communication standard to the first communication standard, and wherein the gateway is configured to send the short message acknowledgement to the first short message service center of the first mobile communication system.

5. The gateway of claim 1, further comprising a temporary database configured to maintain information related to short messaging transactions.

6. The gateway of claim 1, wherein the transformer is further configured to transform the short message from a Mobile-Terminating format to a Mobile-Originating format.

7. A method for communicating messages between a first mobile communication system and a second mobile communication system, comprising:
   receiving at a gateway a routing data query conforming to a first mobile communication standard from a first short message service center located within the first mobile communication system;
   returning an address of the gateway in a response message in response to the routing data query received from the first short message service center;
   receiving a short message directed to a predetermined numerical address space from the first short message service center;
   transforming at the gateway the short message received from the first short message service center from the first mobile communication standard to a second mobile communication standard; and
   directing the short message conforming to the second mobile communication standard to a service center located within the second mobile communication system.

8. The method of claim 7, wherein the service center of the second mobile communication system is a second short message service center.

9. The method of claim 7, wherein the service center of the second mobile communication system is a mobile services switching center.

10. The method of claim 7, further comprising transforming the routing data query to conform with the second mobile communication standard and directing the routing data query conforming with the second mobile communication standard to a home location register of the second mobile communication system.

11. The method of claim 10, further comprising receiving a response message including an address of a mobile services switching center from the home location register and transforming the address of the mobile services switching center received in the response from the home location register to conform to the first mobile communication standard.

12. The method of claim 11, further comprising appending the address of the mobile services switching center to the address of the gateway in the response message to the routing query.

13. The method of claim 7, further comprising transforming an acknowledgment received from the service center located within the second mobile communication system to conform to the first mobile communication standard.

14. The method of claim 7, further comprising maintaining information related to short messaging transactions.

15. The method of claim 7, further comprising transforming the short message from a Mobile-Terminating format to a Mobile-Originating format.

16. A gateway for communicating short messages between a first mobile communication system and a second mobile communication system, comprising:
   means for returning an address of the gateway in response to a routing data query received from a first short message service center of the first mobile communication system, the routing data query associated with a short message to be routed to a subscriber of the second mobile communications system; and
   means for transforming the short message from a first communication standard of the first mobile communication system to a second communication standard of the second mobile communication system for subsequent transmission of the short message to the subscriber of the second mobile communication system.

17. The gateway of claim 16, wherein the means for transforming is further configured to:
   transform the routing data query from the first communication standard of the first mobile communication system to the second communication standard of the second mobile communication system for transmission of the routing data query to a home location register of the second mobile communication system, and further configured to transform an address of a mobile services switching center associated with the subscriber of the second mobile communication system received from the home location register.

* * * * *

UNITED STATES PATENT AND TRADEMARK OFFICE
CERTIFICATE OF CORRECTION

PATENT NO. : 7,640,029 B2  Page 1 of 1
APPLICATION NO. : 11/195518
DATED : December 29, 2009
INVENTOR(S) : Sami Ala-Luukko It is certified that error appears in the above-identified patent and that said Letters Patent is hereby corrected as shown below:

On the Title Pg, insert the Foreign Application Priority Data:

-- (30) Foreign Application Priority Data
Jan. 27, 2000 (FI)................ 20000164
Jan. 26, 2001 (WO)............ WO/FI2001/00074 --

Signed and Sealed this

Twenty-seventh Day of April, 2010

David J. Kappos
*Director of the United States Patent and Trademark Office*